United States Patent [19]

Rodriguez, Jr. et al.

[11] Patent Number: 5,382,991
[45] Date of Patent: Jan. 17, 1995

[54] PIVOTING PROJECTION HEAD FOR OVERHEAD PROJECTOR

[75] Inventors: Ernesto M. Rodriguez, Jr., Round Rock; Ronald K. Bender, Austin, both of Tex.

[73] Assignee: Minnesota Mining and Manufacturing Company, St. Paul, Minn.

[21] Appl. No.: 242,291

[22] Filed: May 13, 1994

[51] Int. Cl.⁶ .............................................. G03B 21/00
[52] U.S. Cl. ................. 353/119; 353/DIG. 3
[58] Field of Search .......... 353/119, DIG. 3, DIG. 4, 353/DIG. 6, 63, 64, 65, 66, 98

[56] References Cited

U.S. PATENT DOCUMENTS

| | | | |
|---|---|---|---|
| 4,353,627 | 10/1982 | Maemori | 353/DIG. 3 |
| 4,696,557 | 9/1987 | Tomizuka | 353/DIG. 4 |
| 4,846,570 | 7/1989 | Kanai | 353/70 |
| 4,969,733 | 11/1990 | Jewison | 353/119 |
| 5,243,371 | 9/1993 | Strohmeyer | 353/119 |

*Primary Examiner*—William A. Cuchlinski, Jr.
*Assistant Examiner*—William C. Dowling
*Attorney, Agent, or Firm*—Gary L. Griswold; Walter N. Kirn; David W. Anderson

[57] ABSTRACT

A mounting for the projection head of an overhead projector allows the head to pivot through an arc of 90° between a position for operation and a position for transportation. A position lock secures the projection head in either of the two positions.

2 Claims, 5 Drawing Sheets

5,382,991

PIVOTING PROJECTION HEAD FOR OVERHEAD PROJECTOR

FIELD OF THE INVENTION

The present invention relates to overhead projectors of the transmissive or reflective types.

BACKGROUND OF THE INVENTION

Overhead projectors have predominately been used in classroom or corporate environments where the projector can remain on a table between uses. Recently, however, there has been an increased desire for projectors which may be easily transported for use at different locations. Besides the obvious desire that such projectors be as light as possible, it is also desirable that the projector fold into as small a package for travel as possible, and that the projector fold easily.

SUMMARY OF THE INVENTION

The present invention provides an improved portable overhead projector of the type including a base having a substantially flat surface for supporting an object the image of which is to be projected, a support arm extending from the base and moveable between a storage position and operational position, a lateral arm extending from the support arm and having at least a portion extending substantially parallel to the base surface when the support arm is in the operational position, and a projection head supported by the lateral arm, the improvement comprising a pivot rotatably mounting the projection head to the lateral arm to allow rotation of the projection head, when the support arm is in the operational position, in a plane substantially parallel to the base surface between a storage position and an operational position, and means for locking the projection head with respect to the lateral arm in the storage position and the operational position. The locking means preferably includes a flat spring having a catch which engages the projection head in the storage and operational positions. The catch may be disengaged from the projection head by means of a lever attached to the catch or a button which displaces the catch when the button is pushed.

BRIEF DESCRIPTION OF THE DRAWINGS

The present invention will be more thoroughly described with respect to the accompanying drawings, wherein like numbers refer to like parts in the several views, and wherein.

DESCRIPTION OF THE PREFERRED EMBODIMENT

Figure 1:
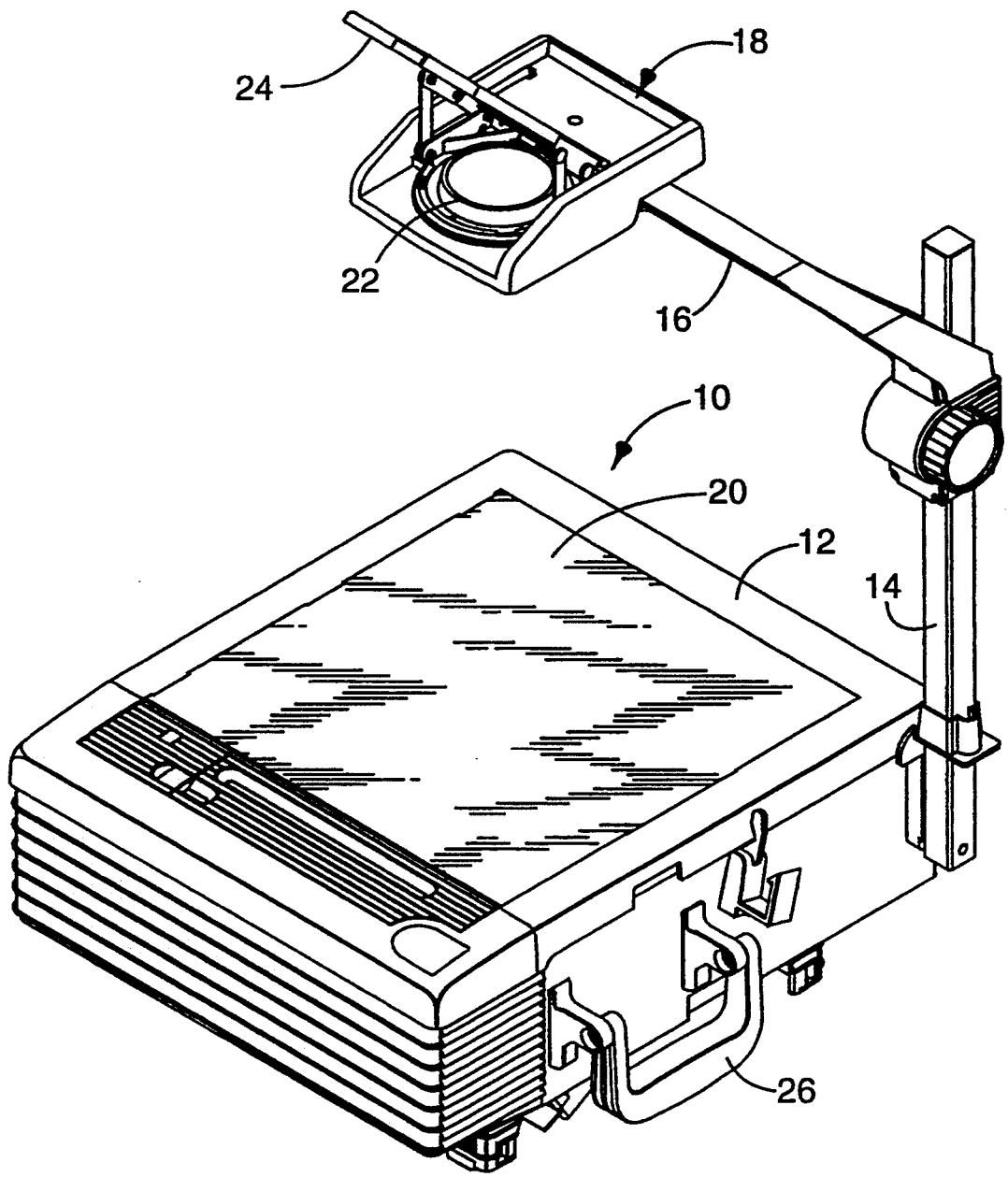
FIG. 1 is a perspective view of an overhead projector with its parts in position for operation.

FIG. 1 illustrates an overhead projector, generally indicated as 10, of the transmissive type. The projector 10 includes a base 12, a support arm 14, a lateral arm 16 extending from the support arm 14 generally parallel to the plane of the base 12 and a projection head 18 attached to and supported by the lateral arm 16. The projector 10 is called a transmissive type because its base 12 includes a light source which directs light through a flat, lenticular upper surface of the base 12 (commonly called a stage) to a projection lens 22 of the projection head 18. Light gathered by the projection lens 22 is reflected by a mirror 24 to a vertical surface. Thus the image of indicia on a transparent film placed on the stage 20 will be projected for viewing by a large audience. Another type of overhead projector is called a reflective type projector because the light source is located in the projection head 18. Light from the source is directed through the film, reflected from a mirrored surface on the base 12 back through the film and collected and projected by the projection head 18 as described above.

Figure 2:
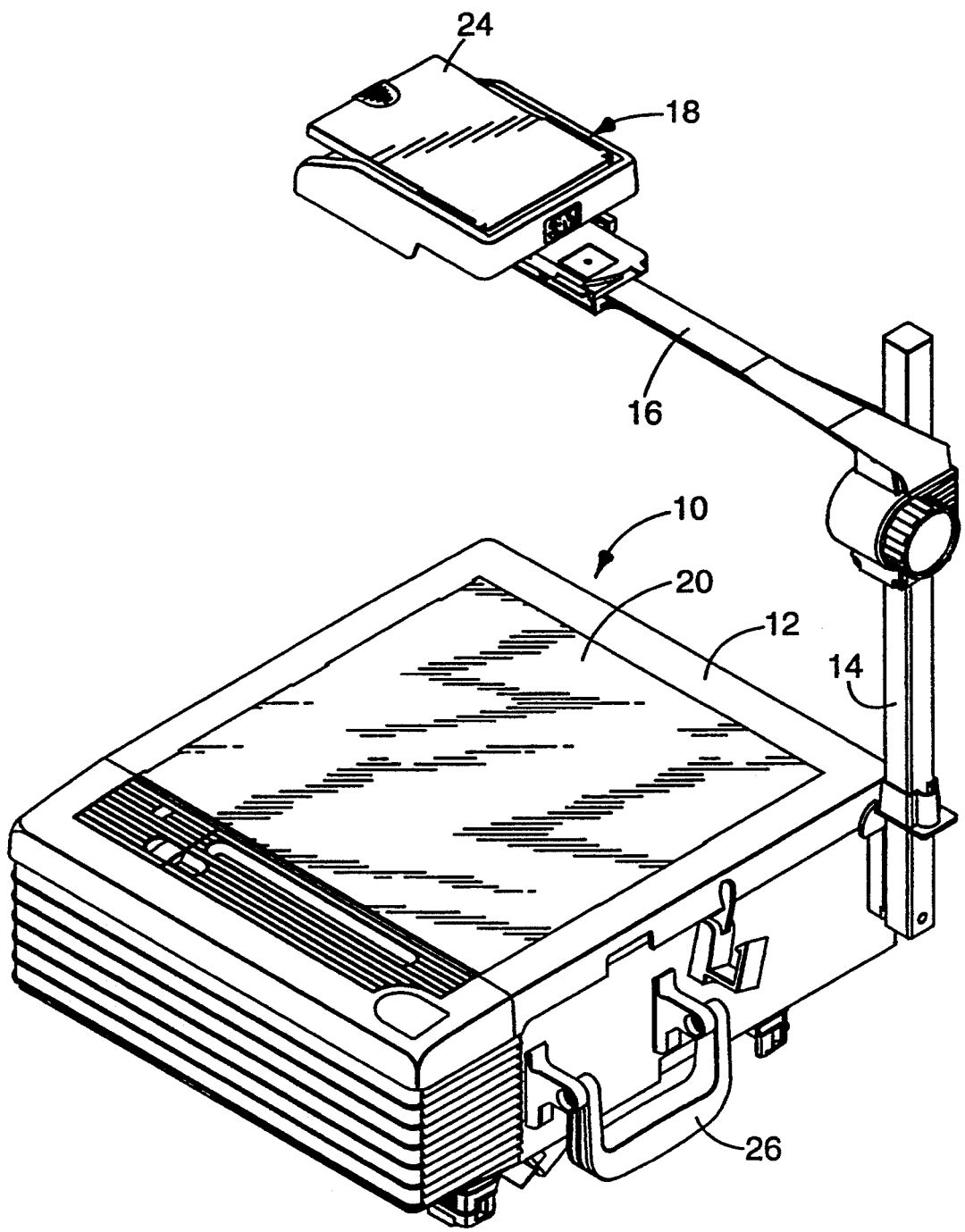
FIG. 2 is a perspective view of the projector of FIG. 1 partially positioned for travel.

In order for the projector 10 to be conveniently transported, the projector 10 should be able to fold into as compact a package as possible. FIG. 2 shows one stage of preparing the projector 10 for transport wherein the projection head 18 is pivoted 90° by means of the present invention in a plane parallel to the stage 20. It will be seen that the mirror 24 has been folded over the projection lens 22.

Figure 3:
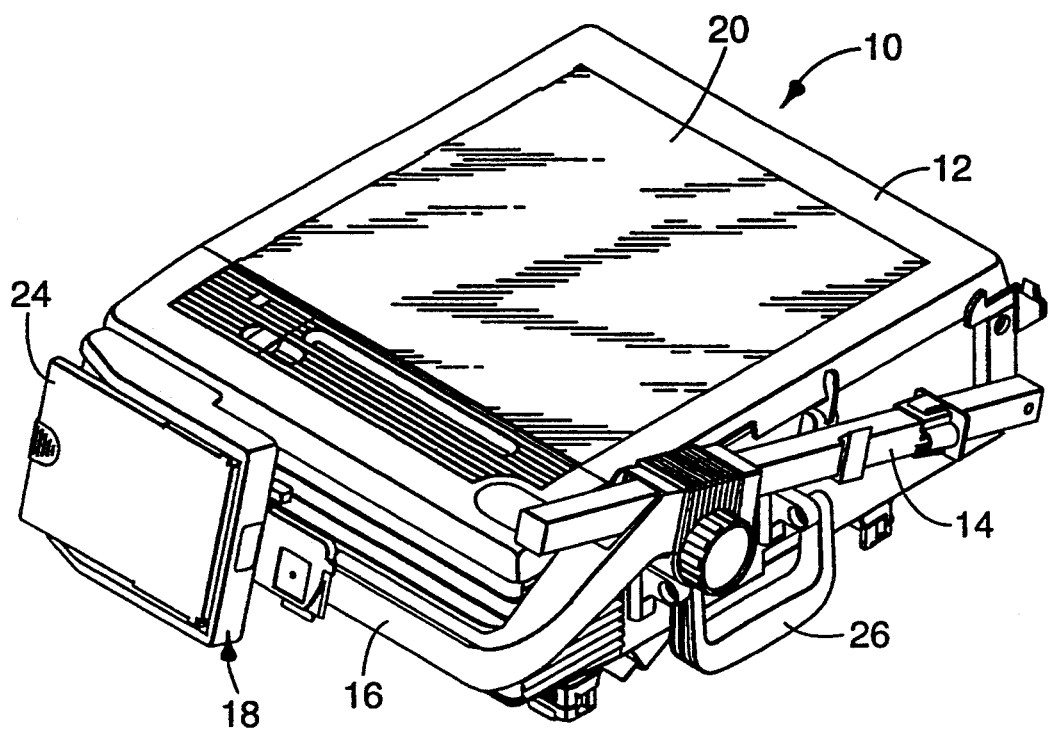
FIG. 3 is the projector of FIG. 1 with its parts fully positioned for travel.

FIG. 3 illustrates the projector 10 folded completely to its transport position wherein the support arm 14 has been rotated forward so that the projection head 18 is disposed adjacent the front surface of the projector 10. A handle 26 is provided to carry the folded projector 10.

Figure 4:
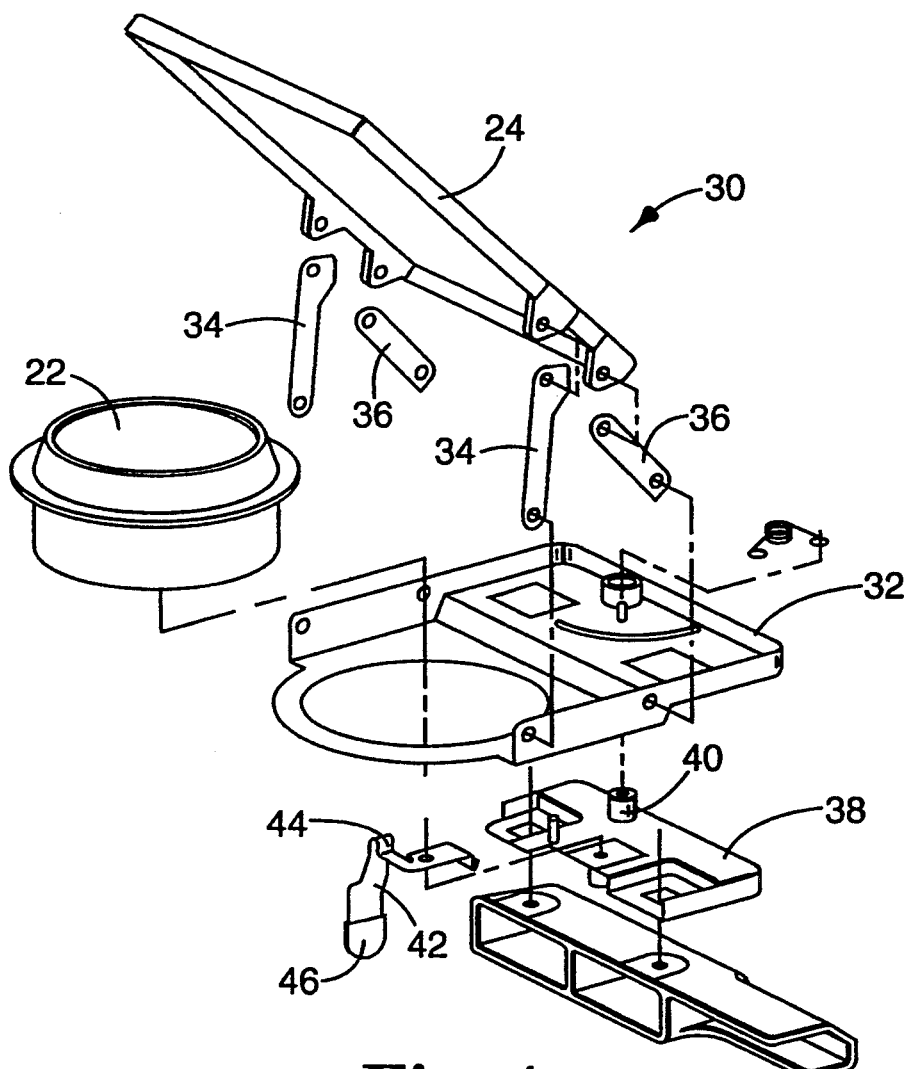
FIG. 4 is an exploded, perspective view of one embodiment of a projection head suitable for use with the projector of FIG. 1.

FIG. 4 illustrates one embodiment of a projection head 30 according to the invention which allows the projection head 30 to pivot for transportation. The projection head 30 includes a lens mount 32 to which is attached the projection lens 22 and the mirror 24. The mirror 24 is attached to the lens mount 32 by means of a two links 34 and 36 on each side of the mirror 24 which allow the mirror 24 to fold flat over the projection lens 22. The lens mount 32 is connected to the lateral arm 16 by a projection head bracket 38 which includes an upright post 40 upon which the projection head 30 is journalled. Attached to the bracket 38 is a position lock 42 in the form of a sheet metal spring having a projecting catch 44 which engages the projection head 30 in the operational position shown in FIG. 1 and the storage position shown in FIG. 2 to retain the projection head 30 in either position. Bending of the position lock 42 by means of a handle 46 releases the catch 44 to allow pivoting of the projection head 30.

Figure 5:
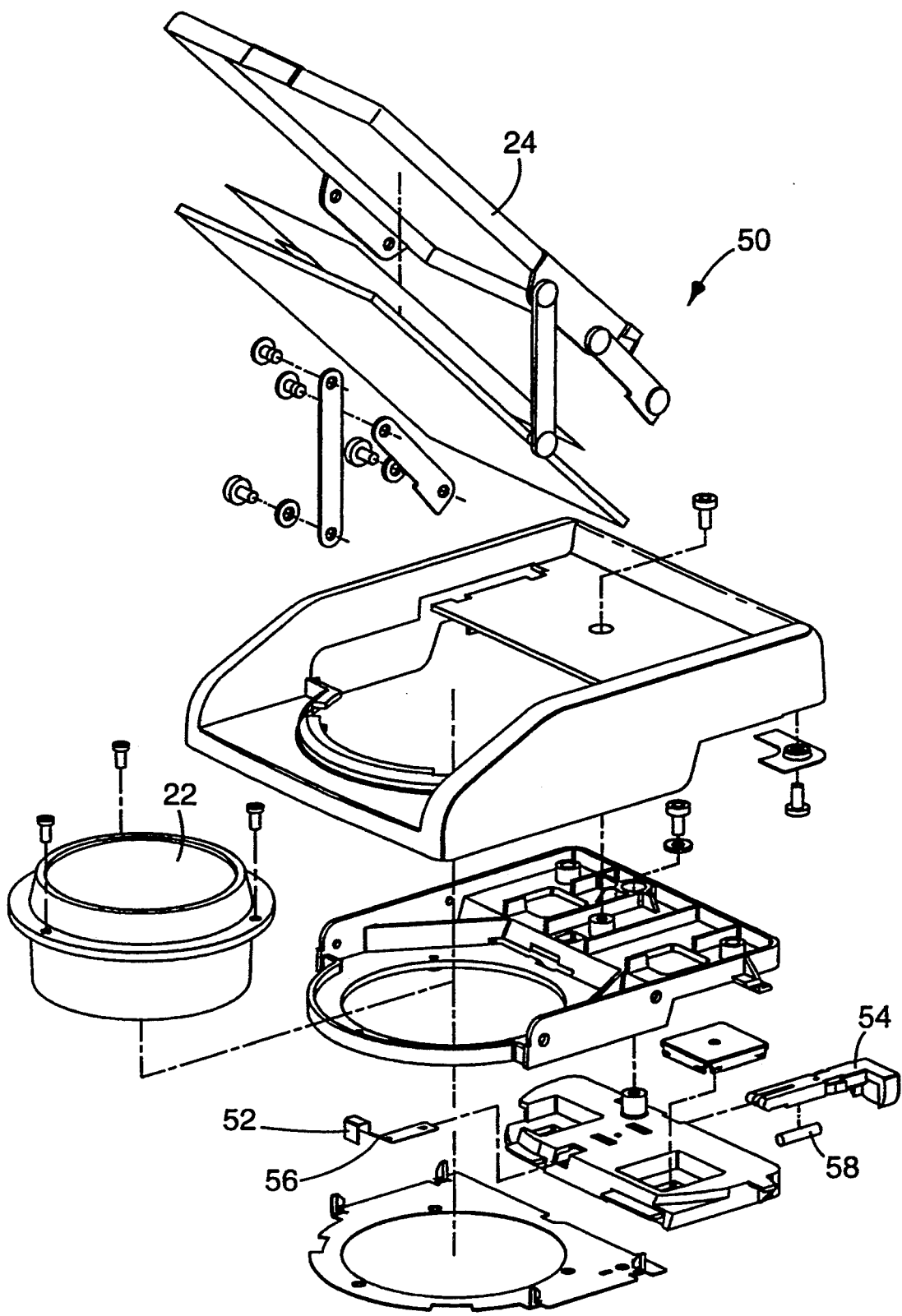
FIG. 5 is an exploded, perspective view of another embodiment of a projection head suitable for use with the projector of FIG. 1.

FIG. 5 illustrates a second embodiment of a projection head 50 which is substantially identical to the projection head 30 of FIG. 4 except that the position lock 52 is of slightly different shape and the position lock 52 is released by a button 54 which bears against a sloped surface 56 of the position lock 52 when the button 54 is pushed. The button 54 is returned by a spring 58 after being released.

Thus there has been described a mounting for a projection head of an overhead projector which allows the head to pivot between an operational position and a storage position, and which allows the projection head to be locked in either of these positions. Many modification will be apparent to those skilled in the art. For example, as noted earlier, the invention is applicable to either the transmissive or reflective types of overhead projectors. Also, the position lock need not be as described. Any means which would retain the projection head in the desired positions would be suitable. As an example, a spring-loaded "bullet" type detent would work, although the position lock described is more secure.

We claim:

1. An improved overhead projector of the type including a base having a substantially flat surface for supporting an object the image of which is to be projected, a support arm extending from the base and moveable between a storage position and operational position, a lateral arm extending from the support arm and having at least a portion extending substantially parallel to the base surface when the support arm is in the operational position, and a projection head supported by the lateral arm, the improvement comprising a pivot rotatably mounting said projection head to said lateral arm to allow rotation of said projection head, when said support arm is in the operational position, in a plane substantially parallel to said base surface between a storage position and an operational position.

2. An improved overhead projector according to claim 1 further including means for locking said projection head with respect to said lateral arm in said storage position and said operational position.

* * * * *